United States Patent [19]

Greenlee et al.

[11] Patent Number: 5,380,786

[45] Date of Patent: Jan. 10, 1995

[54] POLYVINYL CHLORIDE BLENDS HAVING IMPROVED PHYSICAL PROPERTIES INCLUDING LOW TEMPERATURE BRITTLENESS

[75] Inventors: William S. Greenlee; Josef C. Vyvoda; Roman W. Wypart, all of Avon Lake, Ohio

[73] Assignee: The Geon Company, Independence, Ohio

[21] Appl. No.: 634,783

[22] Filed: Dec. 27, 1990

Related U.S. Application Data

[63] Continuation of Ser. No. 324,800, Mar. 17, 1989, abandoned, which is a continuation-in-part of Ser. No. 242,394, Sep. 9, 1988, abandoned.

[51] Int. Cl.⁶ .............................................. C08L 33/06
[52] U.S. Cl. .................................. 524/560; 525/239; 525/244
[58] Field of Search ................... 524/560; 525/239, 244

[56] References Cited

U.S. PATENT DOCUMENTS

| | | | |
|---|---|---|---|
| 2,956,980 | 10/1960 | Law | 525/239 |
| 3,046,237 | 7/1962 | Rosenfelder et al. | 525/239 |
| 3,240,742 | 3/1966 | Hahn et al. | 525/239 |
| 3,554,954 | 1/1971 | Rosis et al. | |
| 3,666,735 | 5/1972 | Rosts | 526/207 |
| 3,903,198 | 9/1975 | Wei | 525/244 |
| 4,028,329 | 6/1977 | Kahn et al. | 525/244 |
| 4,556,694 | 12/1985 | Wallace | 525/239 |
| 4,727,114 | 2/1988 | Chen | 525/239 |
| 4,822,856 | 4/1989 | Moore et al. | 525/239 |

FOREIGN PATENT DOCUMENTS

| | | | |
|---|---|---|---|
| 742770 | 9/1966 | Canada | 525/239 |
| 0111917 | 6/1984 | European Pat. Off. | 526/329.4 |
| 455152 | 2/1970 | Japan | 525/239 |
| 4641370 | 12/1971 | Japan | 525/244 |
| 821035 | 9/1930 | United Kingdom . | |
| 720506 | 12/1954 | United Kingdom . | |
| 817684 | 8/1959 | United Kingdom | 525/244 |

OTHER PUBLICATIONS

Official Gazette 1046 TMOG-2 Sep. 4, 1984.

*Primary Examiner*—Joseph L. Schofer
*Assistant Examiner*—N. Sarofim
*Attorney, Agent, or Firm*—Joe A. Powell; Laura Shunk

[57] ABSTRACT

Polyvinyl chloride-acrylate copolymers are plasticized with plasticizers to produce a composition having low hardness values. For example, Shore A values of 55 or less can be readily achieved. Such low values are often achieved by utilizing low amounts, for example less than 100 parts by weight, of the plasticizer for every 100 parts by weight of the PVC-acrylate copolymer. Low Shore A hardness values are also aided by the use of high amounts of acrylate units in the copolymer, that is amounts of at least 45 percent by weight based upon the total weight of the copolymer. The copolymer is made from a vinyl constituent which is a vinyl chloride monomer with an optional vinyl component comonomer and one or more acrylate monomers having the formula

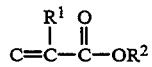

FORMULA I wherein $R^1$ is an aliphatic, an aromatic, or combinations thereof, having from 1 to 18 carbon atoms, or a halogen derivative thereof, or hydrogen, and $R^2$ is an aliphatic, an aromatic, an alkyl hydroxyl, or combinations thereof, having from 1 to 18 carbon atoms, or a halogen derivative thereof; or a hydrocarbyl ether such as an alkoxyalkyl, a phenoxyaryl, a phenoxyalkyl, or combinations thereof, having from 2 to 1,000 carbon atoms, or a substituted halogen, oxygen, sulfur, or nitrogen derivative thereof. In another embodiment, the polyvinyl chloride-acrylate copolymers are blended with low temperature property improving polymers which are non-liquid, high molecular weight polymers.

1 Claim, No Drawings

POLYVINYL CHLORIDE BLENDS HAVING IMPROVED PHYSICAL PROPERTIES INCLUDING LOW TEMPERATURE BRITTLENESS

CROSS REFERENCE

This application is a continuation of application Ser. No. 07/324,800 filed on Mar. 17, 1989 now abandoned for "POLYVINYL CHLORIDE BLENDS HAVING IMPROVED PHYSICAL PROPERTIES INCLUDING LOW TEMPERATURE BRITTLENESS" which application is a continuation-in-part of U.S. Ser. No. 07/242,394, filed Sep. 9, 1988, now abandoned for "VERY SOFT, FLEXIBLE PLASTICIZED POLYVINYL CHLORIDE COMPOSITIONS."

FIELD OF THE INVENTION

The present invention relates to blends having improved low temperature properties. More specifically, the present invention relates to polyvinyl chloride-acrylate copolymers which are blended with low temperature brittleness improving polymers to yield improved physical properties. The properties which are improved include low temperature brittleness, as measured by ASTM D-746, tear properties, as measured by ASTM D-624, and oil swell in hot ASTM #3 oil at 100° C. for 166 hours as measured by ASTM D-471.

BACKGROUND

Heretofore, flexible polyvinyl chloride compositions generally did not have favorable low temperature brittleness and good resistance to shrinkage in hot oil. The blends of the present invention achieve favorable low temperature brittleness, as well as other physical properties. These blends can be utilized as gaskets, sealants, roofing membranes, shoe soles, liners for ponds, hoses, tarpaulins, and the like.

SUMMARY OF THE INVENTION

The flexible polyvinyl chloride blends of the present invention have improved brittleness properties, improved tear properties, and decreased oil swell in hot oil. The blends are processable by a variety of techniques including injection molding, extrusion, calendering, thermoforming, and the like. The blends are based on a polyvinyl chloride-acrylate copolymer blended with low temperature property improving polymers.

DETAILED DESCRIPTION OF THE INVENTION

The flexible polyvinyl chloride compositions of the present invention contain polyvinyl chloride in the form of a copolymer. The copolymer is a polyvinyl chloride-acrylate copolymer made from (a) a vinyl chloride constituent, that is, a vinyl chloride monomer and an optional vinyl component comonomer and (b) one or more acrylate monomers. The amount of vinyl chloride monomer and optional vinyl component comonomer utilized to make the polyvinyl chloride-acrylate copolymer is a sufficient amount so that the polyvinyl chloride-acrylate copolymer generally contains from about 10 parts to about 90 parts by weight, desirably from about 20 parts to about 75 parts by weight and preferably from about 30 parts to about 60 parts by weight of vinyl chloride and/or optional vinyl component units therein for every 100 parts by weight of the copolymer. Thus, the amount of the acrylate units in the copolymer is generally from about 90 parts to about 10 parts by weight, desirably from about 80 to about 25 parts by weight, and preferably from about 70 to about 40 parts by weight. The amount of the optional vinyl component units in the copolymer is from about 0 to about 45 parts by weight with from about 0 to about 20 parts by weight being preferred. In other words, the vinyl chloride constituent can contain up to 50 percent thereof and preferably up to 22 percent thereof by weight of the vinyl component unit. By the term "vinyl component," it is meant a vinyl unit other than vinyl chloride. Such units are well known to the art and to the literature and are derived from vinyl esters wherein the ester portion contains from 1 to 18 carbon atoms such as vinyl acetate; vinylidene chloride; 1,2-dichloroethylene; styrene and styrene derivatives having a total of from 8 to 15 carbon atoms such as alphamethylstyrene, vinyl toluene, chlorostyrene, chloromethylstyrene; vinyl naphthalene; diolefins having a total of from 4 to 18 carbon atoms such as butadiene, isoprene, including halogenated diolefins such as chloroprene; monoolefins having a total of from 2 to 18 carbon atoms and preferably 2 to 4 carbon atoms; carbon monoxide, and the like. Vinyl acetate is a preferred vinyl component comonomer which, upon polymerization, becomes a vinyl component unit.

The one or more acrylate units contained in the polyvinyl chloride-acrylate copolymer have the formula, before polymerization,

FORMULA I wherein $R^1$ is an aromatic, an aliphatic (especially an alkyl), or combinations thereof, having from 1 to 18 carbon atoms, or a halogen derivative thereof, desirably is methyl, and preferably is hydrogen. $R^2$ is an aliphatic group, especially an alkyl, an aromatic, a hydroxylalkyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as an alkoxyalkyl, a phenoxyaryl, or a phenoxyalkyl, or combinations thereof having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethylhexyl acrylate, nonyl acrylate, decyl acrylate, phenyl acrylate, nonylphenyl acrylate, ethyl methacrylate, butyl methacrylate, hexyl methacrylate, 2-ethylhexyl methacrylate, lauryl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethylhexyl acrylate, ethyl acrylate, 2(2-ethoxyethoxy)ethyl acrylate, and the like. As noted hereinabove, the $R^2$ group can be a hydrocarbyl ether group. That is, it can be an ether, a diether, or a multiple ether of an alkyl, an aryl, or combinations thereof, such as an alkoxyalkyl, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof.

Examples of specific alkoxyalkyl acrylates include methoxymethyl acrylate, butoxyethyl acrylate; ethoxypropyl acrylate, methoxyethyl acrylate, ethoxyethyl acrylate, 2(2-ethoxyethoxy)ethylacrylate, and the like. Examples of specific phenoxyalkyl acrylates include 2-phenoxyethylacrylate and 2-phenoxyethylmethacrylate. In addition to the above $R^2$ ether groups, halogen, oxygen, nitrogen, or sulfur derivatives of such hydrocarbyl ether groups can also be utilized. For example $R^2$ can be an alkoxyalkyl containing at least one halogen therein in lieu of a hydrogen atom.

The molecular weight of the polyvinyl chloride-acrylate copolymer is measured in terms of inherent viscosity and is from about 0.3 to about 4.0, desirably from about 0.8 to about 2.5, and preferably from about 1.0 to about 2.2. The inherent viscosity is measured utilizing cyclohexanone as the solvent. It is noted that in some instances viscosity cannot be measured since the polymer will not fully dissolve. The copolymer is dissolved in the solvent at a concentration of 0.2 percent by weight at 90° C. for 90 minutes and then the viscosity is measured with a viscometer in a water bath at 30° C.

The polyvinyl chloride-acrylate copolymer can be polymerized from the above-noted monomers in any conventional manner such as dispersion, emulsion, mass, solution, and the like with suspension being preferred. Generally, polymerization is initiated with a free radical initiator such an alkanoyl, aroyl, alkaroyl, or an aralkanoyl diperoxide, a monohydroperoxide, or an azo compound, a peroxy ester, a percarbonate, or any other suitable free radical-type initiator. Examples of specific initiators include benzoyl peroxide, lauroyl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, dinormal propyl peroxydicarbonate, azo-bisisobutyronitrile, alpha, alpha'-azodiisobutyrate, 2,2'-azo-bis-(2,4-dimethyl valeronitrile), and the like. Polymerization can be carried out at suitable temperatures with temperatures of from about 10° to 85° C. being desired and from about 40° to about 65° C. being preferred. The amount of the initiator utilized is generally quite small as from about 0.005 parts by weight to about 1.0 parts by weight and preferably from about 0.01 to about 0.1 parts by weight for every 100 parts by weight of the total monomers being copolymerized.

The polyvinyl chloride-acrylate copolymer desirably is not crosslinked so that it has good processing properties. However, it is to be understood that it is within the ambit of the present invention to either partially crosslink or crosslink the polyvinyl chloride-acrylate copolymer to provide improved physical properties. Should the polyvinyl chloride-acrylate copolymer be crosslinked or cured, any conventional crosslinking agent can be utilized such as diallyl phthalate, various diacrylates such as butanediol diacrylate, diethylene glycol diacrylate, and the like.

According to the concepts of the first embodiment of the present invention, very soft polyvinyl chloride compositions, that is, compositions containing polyvinyl chloride-acrylate copolymers, are achieved when plasticized with conventional plasticizers. Such plasticizers are generally well known to those skilled in the art as well as in the literature. Examples of suitable plasticizers for the above-noted polyvinyl chloride-acrylate copolymers include various adipic acid derivatives, azelaic acid derivatives, benzoic acid derivatives, citric acid derivatives, epoxy derivatives, ethers, formal derivatives, glycol derivatives, glycolates, glycerol derivatives, polyglycerol derivatives, petroleum derivatives, isobutyric acid derivatives, isophthalic acid derivatives, isosebacic acid derivatives, oleic acid derivatives, paraffin derivatives, pentaerythritol derivative, phosphoric acid derivatives, phthalic acid derivatives, ricinoleic acid derivatives, sebacic acid derivatives, stearic acid derivatives, sulfonamides and sulfonates, tartaric acid derivatives, terephthalates, trimellitates, various plasticizing type polymers such as various polyesters, nitrile-butadiene copolymers, chlorinated polyolefins, oxidized polyolefins, polyepichlorohydrins, polyacrylates, polysiloxanes, and the like, and combinations of the above. The above plasticizers as well as other plasticizers which can be utilized in the present invention include those set forth in *The Technology of Plasticizers*, by Sears and Darby, pages 893–1085, John Wiley & Sons, New York, 1982, which is hereby fully incorporated by reference.

Generally, plasticizers which are preferred in the first embodiment of the present invention include the various adipates, the various phthalates, the various trimellitates, the various copolymers of nitrile-butadiene, the various formals, the various polyesters, and mineral oil and the various polysiloxanes.

The plasticized polyvinyl chloride-acrylate copolymer blends of the first embodiment of the present invention have unexpectedly been found to be very soft, that is have very low Shore A values. Moreover, migration, that is bleed-out of the plasticizer, is generally very low or non-existent. The amounts of plasticizer utilized generally range from about 0 to about 300 parts by weight, desirably from about 2 to about 100 parts by weight and preferably from about 2 to about 50 parts by weight for every 100 parts by weight of the polyvinyl chloride-acrylate copolymer. According to the concepts of the first embodiment of the present invention, it has also been found that if high amounts of acrylate units are contained in the polyvinyl chloride-acrylate copolymer such as at least 45 parts by weight and desirably at least 55 parts by weight, a plasticizer need not always be utilized to achieve a soft polyvinyl chloride-acrylate composition.

Heretofore the lowest Shore A hardness values which could be reasonably obtained with plasticized polyvinyl chloride polymers was generally from about 55 to about 60. However, in accordance with the present invention, effective amounts of plasticizers can be utilized to achieve a Shore A hardness value of about 55 or less, desirably 50 or less, preferably 40 or less, and even 30 or less. Naturally, the amount of plasticizer which is utilized will tend to vary with the type of acrylate comonomer utilized to form the copolymer, the amount of the acrylate comonomer, the type of the plasticizer, and the like. However, as noted above, such amounts are generally low in comparison with conventionally plasticized PVC compounds, and when high amounts of acrylate units are utilized in the polyvinyl chloride-acrylate copolymer, the use of a plasticizer can be, at times, completely eliminated.

Other properties according to the first embodiment of the present invention include the achievement of improved low temperature properties, that is low brittleness temperature as measured by ASTM D-746. Generally, brittleness temperatures of minus 35° C. or less, desirably minus 40° C. or less, and preferably minus 50° C. or less (i.e., colder) are produced. Percent oil swell is also lowered and improved flex modulus, that is a lower flex modulus number, is achieved. According to the present invention, low temperature Clash-Berg modulus are also improved and are generally 50,000 psi or less, desirably 20,000 psi or less, and preferably 10,000 psi or less when measured in accordance with ASTM D-1043 at −35° C.

The plasticized polyvinyl chloride-acrylate copolymers of the present invention can also contain conventional additives in conventional amounts. Thus, various heat stabilizers such as barium/cadmium compounds, lead compounds, and organotin compounds, various conventional lubricants such as paraffin, polyethylene, stearic acid, various processing aids such as polyacrylates, various antioxidants such as BHT, that is butylated hydroxy toluene, BHA, that is butylated hydroxy anisole, various hindered phenols, various UV inhibitors such as substituted benzophenones, and the like, can be utilized.

Various fillers and pigments can also be utilized in conventional amounts such as up to about 200 or 300 parts by weight for every 100 parts by weight of the polyvinyl chloride-acrylate copolymer. Examples of fillers include calcium carbonate, clay, silica, the various silicates, talc, carbon black, and the like. Such fillers are generally added in high amounts as from about 10 to about 200 parts by weight for every 100 parts by weight of the polyvinyl chloride-acrylate copolymer. Examples of various pigments include titanium dioxide, carbon black, and the like. Generally, the amount of such pigment is not as large as the amount of the fillers.

The various additives, fillers, pigments, and the like, are generally added and blended in any conventional manner. For example, the polyvinyl chloride-acrylate copolymer can be blended with the various additives in a Banbury mixer and then processed on a two-roll mill to produce a sheet which can be cubed and then extruded, injection molded, etc. The polyvinyl chloride-acrylate copolymer can also be mixed with the various additives in a high intensity mixer such as a Henschel mixer and then this powder compound can be processed on a two-roll mill into a sheet and cubed or the powder compound can be processed on an extruder into pellets or into the finished article. In general, any conventional compounding equipment such as a Banbury mixer, two-roll mill, extruder, injection molding machine, etc., can be used to produce the products of this invention.

Regardless of the particular blending technique or operation utilized, an important processing advantage of the first embodiment of the present invention is that the various components can be processed on conventional elastomer equipment. Examples of conventional elastomer equipment include mills, mixers, and extruders designed for the processing of elastomers. Such equipment is generally heated and/or cooled. The extruders usually have a length/diameter ratio of 20 or less.

The plasticized polyvinyl chloride-acrylate copolymers of the first embodiment of the present invention can be utilized to produce very soft products with the addition of very little plasticizer. The plasticized copolymer containing the various fillers, additives, etc., can be processed by a variety of techniques including injection molding, extrusion, calendering, thermoforming, and the like. Suitable end use applications include caulks, sealants, gaskets such as automotive gaskets, fishing lures, fabric reinforcement, hot melt adhesives, and the like.

The invention will be better understood by reference to the following examples.

EXAMPLE 1

Procedure of vinyl chloride monomer/2-ethylhexyl acrylate polymerization.

The polymerization vessel was charged with the following ingredients:

| Water | 2223 | kg. |
|---|---|---|
| Vinylchloride monomer | 889 | kg. |
| 2-ethylhexyl acrylate | 593 | kg. |
| Polyvinyl alcohol dispersants | 28.2 | kg. |
| Substituted cellulose dispersant | 22.7 | kg. |
| Initiator | 0.445 | kg. |

The vessel was charged with water and the dispersants first. After evacuation, the mixture of monomers was added and after the mixing of the contents, the temperature was adjusted to 55° C. Lastly, the initiator was added and the reaction started. The polymerization was carried out with agitation for 420 minutes after which time the reactor was cooled to room temperature. The polymer slurry was transferred to a stripping vessel to remove unreacted monomers. After the stripping, the polymer was recovered by filtration and dried.

EXAMPLE 2

Using a resin similar to that given in Example 1, the blends listed in Table I were prepared. The blends using the polyvinyl chloride-acrylate copolymer were prepared by mixing the ingredients on a heated 6"×13" two-roll mill with a mill temperature of 300° F. for 8 minutes after banding. The product was then removed as a sheet from the mill and cut into 6"×6" plaques. The plaques were pressed using a two minute preheat and three minute press time at 320° F. The pressed plaques were then submitted for physical testing. The polyvinyl chloride homopolymer compounds were prepared in a similar fashion except that the mill temperature was 320° F. for the compound containing 90 PHR of plasticizer, 295° F. for the compound containing 100 PHR of plasticizer and these compounds were milled for 5 minutes and 10 minutes after banding, respectively. These compounds were then pressed using a 5 minute preheat and a 5 minute press time at 350° F.

The results in Table I indicate that plasticizers can be added to the polyvinyl chloride-acrylate copolymer to produce products with lower hardness values, better low temperature properties and, depending on the plasticizer chosen, reduced oil swell. These products can have significantly lower hardness values (depending on the level of plasticizer used) than polyvinyl chloride homopolymer resins containing very high levels of a typical polyvinyl chloride plasticizer. Also, plasticizers not typically usable to plasticize polyvinyl chloride homopolymers (silicone fluid and mineral oil) can be used to plasticize the polyvinyl chloride-acrylate copolymers.

TABLE I

| | | | | | | | | | |
|---|---|---|---|---|---|---|---|---|---|
| PVC Homopolymer Resin (1.02 Inherent Viscosity) | 100[1] | 100[2] | — | — | — | — | — | — | — |
| Di-2-ethylhexyl Phthalate | 90 | 100 | — | — | — | — | — | — | — |
| PVC/2-ethylhexyl acrylate copolymer | — | — | 100[1] | 100[1] | 100[1] | 100[1] | 100[1] | 100[1] | 100[1] |
| Silicone Fluid - SF 1265* | — | — | — | 5 | 10 | 20 | — | — | — |
| Mineral Oil - USP White | — | — | — | — | — | — | 5 | 10 | 20 |
| Hardness - Shore A ASTM D-2240 | 64 | 56 | 62 | 58 | 52 | 44 | 55 | 47 | 38 |
| Brittleness Temperature (°C.) ASTM D-746 | −45.5 | −48 | −22.5 | −25.0 | -27.5 | −30.5 | −30.0 | −30.5 | −32.0 |
| Clash-Berg Modulus at −35° C. (psi) ASTM D-1043 | 5000 | 2600 | 53350 | 40300 | 23500 | 21450 | 22600 | 13400 | 10750 |
| Oil Resistance - % Volume Swell ASTM D-471 ASTM #3 Oil - 100° C./166 hrs. | −33 | −54 | 176 | 174 | 178 | 185 | 170 | 162 | 164 |

*SF 1265 is manufactured by General Electric.
[1] Compound also contains - stabilizer 5, co-stabilizer 3, filler 8 and lubricant 0.5. Ingredients added in parts per hundred resin unless otherwise indicated.
[2] Compound also contains - stabilizer 2, co-stabilizer 10, lubricant 0.2

EXAMPLE 3

A resin similar to that described in Example 1 was blended with the ingredients listed in Table II using a laboratory size (BR size) Banbury mixer. The materials were dropped from the Banbury at the stock temperatures indicated in Table II and placed on a 6"×16" unheated mill and formed into a sheet. The sheet was cut into both 1" wide strips and 6"×6" plaques. The 1" wide strips were extruded on an extruder designed for processing elastomeric materials. The extruder was equipped with an approximately 7:1 length/diameter deep-flighted screw and was heated using circulating hot water. The samples were extruded using a Garvey die and the extrusion rates and stock temperatures during extrusion are given in Table II. The 6"×6" plaques were pressed using a two-minute preheat and three minute press time at 320° F. The samples were then submitted for physical testing.

The results in Table II indicate that a plasticizer typically used for polyvinyl chloride homopolymer (di-2-ethylhexyl adipate) and one used for elastomeric materials (dibutoxyethoxyethyl formal) will both effectively plasticize the polyvinyl chloride/2-ethylhexyl acrylate copolymer. The results indicate that products are obtained which have low hardness values, improved low temperature properties and lower percent volume swell when tested in an oil immersion test. Also, the data in Table II demonstrates that these effects are seen with both an organic (carbon black) and an inorganic filler system.

TABLE II[1]

| | | | | | |
|---|---|---|---|---|---|
| PVC/2-ethylhexyl acrylate copolymer | 100 | 100 | 100 | 100 | 100 |
| Di-2-ethylhexyl adipate | — | 5 | 10 | 20 | 50 |
| Dibutoxyethoxyethyl formal | — | — | — | — | — |
| Calcium carbonate - 3.5μ uncoated | 50 | 50 | 50 | 50 | 50 |
| Carbon black - N550 grade | — | — | — | — | — |
| Banbury Stock Temperature (°F.) | 302 | 284 | 297 | 290 | 282 |
| Extrusion Stock Temperature (°F.) | 217 | 212 | 195 | 200 | 155 |
| Extrusion rate (g/min.) | 256 | 226 | 220 | 156 | 218 |
| Hardness - Shore A ASTM D-2240 | 64 | 53 | 50 | 37 | 15 |
| Brittleness Temperature (°C.) ASTM D-746 | −24 | −36.5 | −37.5 | −45 | −59.5 |
| Clash-Berg Modulus at −35° C. (psi) ASTM D-1043 | 85150 | 36000 | 21250 | 1550 | * |
| Oil Resistance - % Volume Swell ASTM D-471, ASTM #3 Oil - 100° C./166 hours. | 234 | 243 | 219 | 192 | 152 |
| PVC/2-ethylhexyl acrylate copolymer | 100 | 100 | 100 | 100 | 100 |
| Di-2-ethylhexyl adipate | — | — | — | 5 | 10 |
| Dibutoxyethoxyethyl formal | 10 | 20 | — | — | — |
| Calcium carbonate - 3.5μ uncoated | 50 | 50 | — | — | — |
| Carbon black - N550 grade | — | — | 20 | 20 | 20 |
| Banbury Stock Temperature (°F.) | 307 | 293 | 327 | 324 | 315 |
| Extrusion Stock Temperature (°F.) | 207 | 200 | 217 | 215 | 212 |
| Extrusion rate (g/min.) | 180 | 200 | 212 | 198 | 172 |
| Hardness - Shore A ASTM D-2240 | 45 | 34 | 75 | 68 | 60 |
| Brittleness Temperature (°C.) ASTM D-746 | −37.5 | −46 | −28 | −28.5 | −36 |
| Clash-Berg Modulus at −35° C. (psi) ASTM D-1043 | 10900 | 1100 | 73300 | 32250 | 11050 |
| Oil Resistance - % Volume Swell ASTM D-471, ASTM #3 Oil - | 206 | 185 | 183 | 166 | 163 |

TABLE II[1]-continued

100° C./166 hours.

| | | | | |
|---|---|---|---|---|
| PVC/2-ethylhexyl acrylate copolymer | 100 | 100 | 100 | 100 |
| Di-2-ethylhexyl adipate | 20 | 50 | — | — |
| Dibutoxyethoxyethyl formal | — | — | 10 | 20 |
| Calcium carbonate - 3.5μ uncoated | — | — | — | — |
| Carbon black - N550 grade | 20 | 20 | 20 | 20 |
| Banbury Stock Temperature (°F.) | 306 | 286 | 310 | 317 |
| Extrusion Stock Temperature (°F.) | 208 | 192 | 214 | 200 |
| Extrusion rate (g/min.) | 128 | 222 | 174 | 188 |
| Hardness - Shore A ASTM D-2240 | 47 | 23 | 60 | 44 |
| Brittleness Temperature (°C.) D-746 | −42.5 | −61 | −36.5 | −42.5 |
| Clash-Berg Modulus at −35° C. (psi) ASTM D-1043 | 1750 | * | 15700 | 1500 |
| Oil Resistance - % Volume Swell ASTM D-471, ASTM #3 Oil - 100° C.166 hours. | 153 | 115 | 169 | 166 |

[1]Compounds also contain - stabilizer 5, co-stabilizer 3, lubricant 0.75 and antioxidant 0.5. Ingredients added in parts per hundred resin unless otherwise indicated.
*Value was too low to be recorded by test apparatus.

EXAMPLE 4

The polymerization vessel was charged with the following ingredients in the order as given in the text below:

| | |
|---|---|
| Water | 26.67 kg |
| Vinyl chloride monomer #1 | 8.99 kg |
| Vinyl chloride monomer #2 | 2.7 kg |
| 2-ethylhexyl acrylate #1 | 6.07 kg |
| n-butyl acrylate #1 | 0.674 kg |
| 2-ethylhexyl acrylate #2 | 2.02 kg |
| n-butyl acrylate #2 | 0.225 kg |
| Polyvinyl alcohol dispersant #1 | 390 g. of 5.0% water solution |
| Polyvinyl alcohol dispersant #2 | 170 g. of 5.3% water solution |
| Substituted cellulose dispersant | 550 g. of 2.3% water solution |
| Initiator | 14.4 g. |

The vessel was first charged with water and then followed by the dispersants. After evacuation, the mixture of 2-ethylhexyl acrylate #1, n-butyl acrylate #1, and vinyl chloride monomer #1 was added and after the mixing of the contents, the temperature was adjusted to 50° C. with constant agitation. Lastly, the initiator was added and the reaction started. Then a mixture of 2-ethylhexyl acrylate #2 and n-butyl acrylate #1 was metered during the first half of the reaction. Vinyl chloride monomer #2 was metered near the end of the reaction. The polymerization was carried out for 540 minutes, after which time the reactor was cooled to room temperature. The polymer slurry was transferred to a stripping vessel to remove unreacted monomers. After stripping, the polymer was recovered by filtration and drying. About 14.6 kilograms (32.2 lbs) of polymer was obtained in the form of a white rubbery powder.

The resin from Example 4 was compounded in a manner and under conditions similar to the polyvinyl chloride acrylate copolymer based compound in Example 2 using a 6"×13" two-roll mill. Samples were removed as a sheet from the mill and cut into 6"×6" plaques. The plaques were pressed in a manner as set forth in Example 2 and tested. The results of this testing are given in Table III.

The results in Table III indicate that products with low Shore A hardness values, good low temperature brittleness values according to ASTM D746, and relatively low Clash-Berg moduli according to ASTM D-1043 can be achieved without the addition of a plasticizer. The addition of a relatively small amount of plasticizer results in a significant reduction in Clash-Berg modulus and Shore A hardness.

TABLE III[1]

| | Resin Example 4 | Resin Example 4 with 2.5 phr of DIDP |
|---|---|---|
| Hardness (Shore A) ASTM D-2240 | 48 | 44 |
| Tensile Strength (psi) ASTM D-412 | 750 | 590 |
| Elongation (%) ASTM D-412 | 430 | 500 |
| Clash-Berg Modulus (psi) at −35° C. ASTM D-1043 | 67700 | 52000 |
| Brittleness Temperature (°C.) ASTM D-746 | −30 | −31 |
| Compression Set (%) ASTM D-395 Method B | | |
| (22 Hrs., 100° C.) | 45 | 44 |
| (22 Hrs., RT) | 40 | 41 |

[1]Compounds also contain - tin stabilizer 1.8, co-stabilizer 0.25, lubricants 1.5, and antioxidant 0.2 phr. Ingredients added in parts per hundred resin unless otherwise indicated.
DIDP = Diisodecyl phthalate According to another embodiment, the polyvinyl chloride-acrylate copolymers are blended with low temperature brittleness improving polymers which are nonliquid and high molecular weight. These polymers are physically blended with the polyvinyl chloride-acrylate copolymers to produce a generally homogeneous and compatible blend. The term "low temperature property improving polymers" is used as a generic description of the polymers blended with the polyvinyl chloride-acrylate copolymers of the present invention. These polymers are generally thermoplastic, i.e. are processable on thermoplastic equipment, and have a high weight average molecular weight, i.e. greater than 5,000, and preferably greater than 10,000. The resultant blends have good low temperature brittleness properties of less than $-10°$ C., and preferably less than -20° C., as measured by ASTM D746. The blends have a Shore A hardness value of less than or equal to about 90, and preferably less than or equal to 85 as measured by ASTM D-2240. The blends also display an oil swell in hot ASTM #3 oil at 100° C. for 166 hours of from about 0 percent to about 300 percent, and preferably from about 0 percent to about 200 percent. Tear resistance is also improved and is greater than 30 lbs/in, preferably greater than 50 lbs/in, and most preferably greater than 100 lbs/in, as measured by ASTM D-624 die C. Broadly speaking, the following classes of polymers are suitable: polyester elastomers, polyurethanes, thermoplastic rubbers, and ethylene homopolymer or copolymers. These can be used separately or in combination.

Suitable polyester elastomers include those commercially available under the trade name of "Hytrel", manufactured by E.I. DuPont DeNemours, Inc. and under the tradename of "Lomod" manufactured by General Electric, Inc. The polyesters are generally the condensation polymerization product of a polyether diol or polyol with a dicarboxylic acid. The weight average molecular weight of suitable polyester elastomers is generally greater than 5,000, and desirably greater than 10,000. Most preferably, suitable polyester elastomers have a Shore D hardness ASTM D2240, of less than about 50. A description of such elastomers is found in *Thermoplastic Elastomers* by N. L. Legge, G. Holden and H. E. Schroeder, pp. 163-196, Hansen Publishers, Munich, 1987, and *Handbook of Thermoplastic Elastomers*, by B. Walker, pp. 103-215, Krieger Publishing, Melbourne, Fla., 1986, which are fully incorporated by reference.

Polyurethanes which are suitable include those made from an intermediate generally made from a polyester or polyether polyol and may contain a low molecular weight diol chain extender. The intermediate generally has a weight average molecular weight of greater than 500. The intermediate is reacted with a polyisocyanate having a formula $(RNCO)_n$, wherein R is an aliphatic or an aromatic, or combinations thereof. The subscript "n" can generally be an integer of from 2 to about 4, with 2 being preferred. Inasmuch as the low temperature brittleness improving polymers are thermoplastic, the polyurethanes are not highly crosslinked with a curing agent. Slight or partial crosslinking can occur but to a limited amount in that the urethane polymer must be flexible. A description of such polyurethanes can be found in *Thermoplastic Elastomers*, pp. 13-46 and *Handbook of Thermoplastic Elastomers*, pp. 216-246. Such polyurethanes can be extrusion grade, injection molding grade, and calendering grade. Specific examples of suitable extrusion grade polyurethanes include those having a melt index of 5 to 50 grams per 10 minutes measured from 190° to 210° C. with a load of 1200-8700 grams. Preferably, the polyurethane has a Shore D hardness, ASTM D2240, of less than about 50.

The thermoplastic rubbers or elastomers of the present invention are not cured or only cured to a limited or partial extent. The terms "elastomer" and "rubber" are used interchangeably herein. Suitable elastomers or rubbers include natural rubber; ethylenepropylene rubber; derivatives of polyethylene such as "Hypalon" from E.I. DuPont de Nemours, Inc; ethylene-propylene-diene rubber; rubbers made from conjugated dienes having from 4 to 12 carbon atoms, and preferably from 4 to 8 carbon atoms; butyl and halogenated butyl elastomers; silicone elastomers; fluorocarbon elastomers; rubbers made from such conjugated dienes and vinyl substituted aromatics having from 8 to 12 carbon atoms; elastomers prepared from halogenated diolefins such as polychloroprene; thermoplastic elastomers; and block or graft copolymers and overpolymers. Suitable rubbers include those described in *Rubber Technology*, by M. Morton, Van Nostrand Reinhold Company, New York, 1987, which is fully incorporated herein by reference. Preferred elastomers include ethylene-propylene rubber; ethylene-propylene-diene rubber; butyl rubber such as polyisobutylene polymerized with isoprene; styrene-butadiene rubber; polybutadiene; polyisoprene; natural rubber; silicone elastomers; elastomers prepared from halogenated diolefins, for example polychloroprene; styrene conjugated diene block copolymers including inter alia "Kraton" from Shell, Inc.; thermoplastic elastomers and dynamically vulcanized thermoplastic elastomers such as "Santoprene", sold by Monsanto Inc.; graft copolymers and/or overpolymers of styrene, methyl styrene, methacrylate, methylmethacrylate, and acrylonitrile on elastomeric materials. Suitable examples of such graft copolymers and/or overpolymers include acrylonitrile-butadienestyrene, methylmethacrylate-butadiene-styrene, methacrylate-butadiene-styrene, acrylonitrile-styrene-acrylate, methylmethacrylate-acrylate rubber, and methacrylate-acrylate rubber, acrylonitrile-styrene-chlorinated polyethylene, methacrylate-acrylonitrile-butadiene-styrene, acrylonitrile-methyl styrene-butadiene-styrene, and the like, or combinations thereof. Typical examples would include BTA 733 from Rohm and Haas, Inc.; Blendex 338 from General Electric, Inc.; and Durastrength 200 from M&T Chemicals, Inc. The weight average molecular weight of such elastomers or rubbers is generally in excess of 15,000 and preferably in excess of 50,000, and most preferably in excess of 100,000. In examples were there is significant crosslinking, the weight average molecular weight will, of course, be higher values. These elastomers may have the additional benefit of improving compression set.

Suitable ethylene-based polymers include copolymers of ethylene with 1) vinyl esters having from 1 to 18 carbon atoms in the acid portion used to make the ester, with vinyl acetate being preferred; 2) acrylates, wherein the acrylate has from 1 to 18 carbon atoms in the alcohol portion used to make the acrylate; and 3) monoolefins having from 2 to 18 carbon atoms, with from 2 to 8 carbon atoms being preferred and low density polyethylene. Combinations of the foregoing can be used. A further suitable ethylene based polymer is a terpolymer made from ethylene, vinyl esters, and carbon monoxide. Preferable ethylene copolymers include a copolymer of ethylene with one or more of (1) vinyl acetate; (2) acrylate esters, wherein the alcohol portion used to make the ester has from 1 to 4 carbon atoms; (3) monoolefins having from 2 to 8 carbon atoms; and (4) carbon monoxide. Most preferably the ethylene copolymer is selected from the group consisting of ethylene-vinyl acetate-carbon monoxide, ethylene-vinyl acetate, ethylene-ethylacrylate, and ethylene-methylacrylate. The weight average molecular weight of the ethylene polymers is generally in excess of 10,000 and preferably in excess of 50,000, and most preferably in excess of 100,000. The ethylene content in the copolymers should be greater than 20 percent, preferably greater than 40 percent, and most preferably greater than 50 percent.

The foregoing will be better understood with reference to the following examples.

EXAMPLE 5

The blends listed in Table IV were prepared using a resin similar to that described in Example 1. These blends were prepared on a heated 6"×13" two-roll mill with a roll temperature of 320° F. The blends were milled for 2 minutes after banding and then removed as sheets from the mill. The sheets were cut into 6"×6" plaques and compression molded. The compression molded plaques were then submitted for physical testing.

The results in Table IV indicate that enhanced low temperature brittleness properties, tear strengths and lower volume swell in hot oil can be obtained by adding a polymeric additive (polyester elastomer) to a polyvinyl chloride-acrylate copolymer.

TABLE IV[1]

| | | | | | |
|---|---|---|---|---|---|
| PVC/2-Ethylhexyl Acrylate Copolymer | 100 | 100 | 100 | 100 | 100 |
| Polyester Elastomer (Hytrel 4056)[2] | — | 1.0 | 5.0 | 10.0 | 20 |
| Hardness - Shore A ASTM D-2240 | 58 | 62 | 64 | 66 | 72 |
| Brittleness Temp. (°C.) ASTM D-746 | −30.5 | −30.5 | −34.0 | −34.5 | −32.5 |
| Clash-Berg Modulus at −35° C. (psi) ASTM D-1043 | 65,300 | 63,500 | 60,200 | 74,450 | 72,150 |
| Oil Resistance - % Volume Swell, ASTM D-471, ASTM #3 Oil 100° C./166 Hrs. | 177 | 175 | 166 | 145 | 122 |
| Tear Strength (PPI) ASTM D-624, die C | 103 | 100 | 120 | 130 | 157 |

[1]Compounds also contain - stabilizer 5, co-stabilizer 3, filler 8, antioxidant 0.5, and lubricant 0.75. Ingredients are added in parts per hundred resin unless otherwise indicated.
[2]E. I. DuPont de Nemours, Inc.

EXAMPLE 6

Using a resin similar to that given in Example 1, the blends listed in Tables V, VI, and VII were prepared. These blends were prepared by mixing the ingredients on a heated 6"×13" two-roll mill with a roll temperature of 300° to 390° F. depending on the substrate being blended. The blends were milled for 8 minutes after banding and the products were then removed as sheets from the mill and cut into 6"×6" plaques. The plaques were pressed at 320° F. using a two minute preheat and a three minute press cycle. The pressed plaques were then submitted for physical testing.

The results in Tables V, VI and VII indicate that a polyurethane as well as two different types of ethylene copolymers can be added to a polyvinyl chloride-acrylate copolymer in the presence of a standard plasticizer and give products with enhanced low temperature brittleness properties, tear strengths and, depending on the polymeric additive selected, lower volume swell values when immersed in hot oil.

TABLE V

| | | | | | |
|---|---|---|---|---|---|
| PVC/2-Ethylhexyl Acrylate Copolymer | 100[1] | 100[1] | 100[1] | 100[1] | 100[1] |
| Thermoplastic Polyurethane (Melt Index 5-17 g/10 min. at 210° C., 3800 g. load) | — | 10 | 20 | 50 | 100 |
| Chlorinated Polyethylene | 5 | 5 | 5 | 5 | 5 |
| Phosphate Plasticizer | 5 | 5 | 5 | 5 | 5 |
| Hardness - Shore A ASTM D-2240 | 78 | 83 | 82 | 81 | 80 |
| Brittleness Temp. (°C.) ASTM D-746 | −13.5 | −11.5 | −15 | −20 | −29.5 |
| Clash-Berg Modulus at −35° C. (psi) ASTM D-1043 | 92,550 | 103,650 | 93,900 | 75,400 | 60,000 |
| Oil Resistance - % Vol. Swell ASTM D-471, ASTM #3 Oil 100° C./166 Hrs. | 141 | 118 | 124 | 96 | 69 |
| Tear Strength (PPI) ASTM D-624, die C | 150 | 190 | 165 | 190 | 220 |
| PVC/2-Ethylhexyl Acrylate Copolymer | 100[2] | 100[2] | 100[2] | 100[2] | 100[2] |
| Thermoplastic Polyurethane (Melt Index 5-17 g/10 min. at 210° C., 3800 g. load) | — | 10 | 20 | 50 | 100 |
| Chlorinated Polyethylene | 5 | 5 | 5 | 5 | 5 |
| Phosphate Plasticizer | 5 | 5 | 5 | 5 | 5 |
| Hardness - Shore A ASTM D-2240 | 67 | 67 | 72 | 71 | 73 |
| Brittleness Temp. (°C.) ASTM D-746 | −21 | −21.5 | −25.5 | −25.5 | −28 |

TABLE V-continued

| | | | | | |
|---|---|---|---|---|---|
| Clash-Berg Modulus at −35° C. (psi) ASTM D-1043 | 49,850 | 56,850 | 65,750 | 58,650 | 45,650 |
| Oil Resistance - % Vol. Swell ASTM D-471, ASTM #3 Oil 100° C./166 Hrs. | 157 | 159 | 133 | 94 | 61 |
| Tear Strength (PPI) ASTM D-624, die C | 120 | 115 | 145 | 190 | 290 |

[1] Compound also contains - stabilizer and lubricants 7.9, fire retardant gand antioxidant 3.45, filler 35, pigment and fungicide 16. Ingredients are added in parts per hundred resin unless otherwise indicated.
[2] Compound also contains stabilizer and lubricant 5.5, co-stabilizer 3, filler 5, fire retardant and antioxidant 3.45, pigment and fungicide 16 Ingredients are added in parts per hundred resin unless otherwise indicated.

TABLE VI

| | | | | | | | | | | |
|---|---|---|---|---|---|---|---|---|---|---|
| PVC/2-Ethylhexyl Acrylate Copolymer | 100[1] | 100[1] | 100[1] | 100[1] | 100[1] | 100[2] | 100[2] | 100[2] | 100[2] | 100[2] |
| Ethylene-Vinyl Acetate-Carbon Monoxide Terpolymer (Elvaloy 741)[3] | — | 10 | 20 | 50 | 100 | — | 10 | 20 | 50 | 100 |
| Chlorinated Polyethylene | 5 | 5 | 5 | 5 | 5 | 5 | 5 | 5 | 5 | 5 |
| Phosphate Plasticizer | 5 | 5 | 5 | 5 | 5 | 5 | 5 | 5 | 5 | 5 |
| Hardness - Shore A ASTM D-2240 | 73 | 78 | 77 | 74 | 73 | 62 | 65 | 65 | 63 | 66 |
| Brittleness Temp. (°C.) ASTM D-746 | −17 | −19 | −19 | −23 | −23.5 | −23 | −26.5 | −24 | −29.5 | −32 |
| Clash-Berg Modulus at −35° C. (psi) ASTM D-1043 | 101,450 | 102,050 | 97,300 | 86,500 | 74,750 | 52,450 | 53,550 | 56,150 | 55,200 | 54,400 |
| Oil Resistance - % Vol. Swell ASTM D-471, ASTM #Oil 100° C./166 Hrs. | 171 | 163 | 153 | 143 | 132 | 183 | 174 | 166 | 149 | 137 |
| Tear Strength (PPI) ASTM D-624, die C | 120 | 140 | 140 | 150 | 170 | 95 | 105 | 105 | 115 | 135 |

[1] Compound also contains - stabilizer and lubricants 7.9, fire retardant and antioxidant 3.45, filler 35, pigment and fungicide 16. Ingredients added in parts per hundred resin unless otherwise indicated.
[2] Compound also contains - stabilizer and lubricant 5.5, co-stabilizer 3, filler 5, fire retardant and antioxidant 3.45, pigment and fungicide 16. Ingredients are added in parts per hundred resin unless otherwise indicated.
[3] E. I. DuPont de Nemours, Inc.

TABLE VII

| | | | | | | | | | | |
|---|---|---|---|---|---|---|---|---|---|---|
| PVC/2-Ethylhexyl Acrylate Copolymer | 100[1] | 100[1] | 100[1] | 100[1] | 100[1] | 100[2] | 100[2] | 100[2] | 100[2] | 100[2] |
| Ethylene-Ethyl Acrylate Copolymer (6169NT, Union Carbide) | — | 10 | 20 | 50 | 100 | — | 10 | 20 | 50 | 100 |
| Chlorinated Polyethylene | 5 | 5 | 5 | 5 | 5 | 5 | 5 | 5 | 5 | 5 |
| Phosphate Plasticizer | 5 | 5 | 5 | 5 | 5 | 5 | 5 | 5 | 5 | 5 |
| Hardness - Shore A ASTM D-2240 | 73 | 73 | 75 | 79 | 83 | 63 | 64 | 68 | 75 | 79 |
| Brittleness Temp. (°C.) ASTM D-746 | −15.5 I | −19.5 | −20.5 | −22 | −26.5 | −23 | −24.5 | −20 | −24 | −27.5 |
| Clash-Berg Modulus at −35° C. (psi) ASTM D-1043 | 114,400 | 75,850 | 78,600 | 58,800 | 43,200 | 58,450 | 44,800 | 41,750 | 34,500 | 27,000 |
| Oil Resistance - % Vol. Swell ASTM D-471, ASTM #3 Oil 100° C./166 Hrs. | 165 | 268 | 271 | 208 | * | 155 | 282 | 153 | * | * |
| Tear Strength (PPI) ASTM D-624, die C | 126 | 132 | 125 | 149 | 190 | 107 | 109 | 116 | 143 | 178 |

[1] Compound also contains - stabilizer and lubricants 7.9, fire retardant and antioxidant 3.45, filler 35, pigment and fungicide 16. Ingredients are added in parts per hundred resin unless otherwise indicated.
[2] Compounds also contain - stabilizer and lubricant 5.5, co-stabilizer 3, filler 5, fire retardant and antioxidant 3.45, pigment and fungicide 16. Ingredients are added in parts per hundred resin unless otherwise indicated.
*Samples disintegrated.

EXAMPLE 7

The blends listed in Tables VIII, IX, X and XI were prepared using a resin similar to that as described in Example 1. These blends were prepared on a neared 6"×13" two-roll mill with a roll temperature of 320° to 375° F. depending on the type and level of polymeric additive. The blends were removed from the mill as a sheet and cut into 6"×6" plaques. These plaques were compression molded using a 5 minute preheat and 5 minute press cycle at 350° F. The molded specimens were then submitted for physical testing.

The results in Tables VIII, IX, X and XI indicate that products with significantly improved low temperature brittleness properties, improved tear strength and, depending on the .polymer blending agent selected, reduced volume swell in hot oil, can be produced by blending thermoplastic rubbers with a polyvinyl chloride-acrylate copolymer.

TABLE VIII[1]

| | | | | | | | |
|---|---|---|---|---|---|---|---|
| PVC/2-Ethylhexyl Acrylate Copolymer | 100 | 100 | 100 | 100 | 100 | 100 | 100 |
| Paraloid BTA 733[2] (Methacrylate-Butadiene-Styrene Polymer) | — | 20 | 50 | 100 | 200 | 300 | 400 |

TABLE VIII[1]-continued

| | | | | | | | |
|---|---|---|---|---|---|---|---|
| Calcium Carbonate —3.5μ Uncoated | — | — | — | — | — | — | — |
| Hardness - Shore A ASTM D-2240 | 61 | 69 | 76 | 80 | 85 | 85 | 85 |
| Brittleness Temp. (°C.) ASTM D-746 | −22 | −17.5 | −41 | −45.5 | −48 | −47.5 | −47 |
| Clash-Berg Modulus at −35° C. (psi) ASTM D-1043 | 61,050 | 41,500 | 29,600 | 21,350 | — | 10,850 | 13,400 |
| Oil Resistance - % Vol. Swell ASTM D-471, ASTM #3 Oil 100° C./166 Hrs. | 180 | 175 | 166 | 165 | 144 | 145 | 158 |
| Tear Strength (PPI) ASTM D-624, die C | 107 | 119 | 130 | 162 | 140 | 135 | 140 |
| PVC/2-Ethylhexyl Acrylate Copolymer | 100 | 100 | 100 | 100 | 100 | 100 | 100 |
| Paraloid BTA 733[2] (Methacrylate-Butadiene-Styrene Polymer) | — | 20 | 50 | 100 | 200 | 300 | 400 |
| Calcium Carbonate —3.5μ Uncoated | 20 | 20 | 20 | 20 | 20 | 20 | 20 |
| Hardness - Shore A ASTM D-2240 | 67 | 73 | 78 | 82 | 85 | 85 | 86 |
| Brittleness Temp. (°C.) ASTM D-746 | −25 | −30.5 | −41 | −47 | −46.5 | −49.5 | −47.5 |
| Clash-Berg Modulus at −35° C. (psi) ASTM D-1043 | 68,300 | 53,550 | 38,650 | 23,200 | 17,550 | 12,350 | 16,250 |
| Oil Resistance - % Vol. Swell ASTM D-471, ASTM #3 Oil 100° C./166 Hrs. | 160 | 160 | 166 | 164 | 143 | 136 | 146 |
| Tear Strength (PPI) ASTM D-624, die C | 97 | 107 | 115 | 142 | 140 | 135 | 145 |

[1]Compounds also contain - stabilizer 3, co-stabilizer 4, lubricant and antioxidant 1.0. Ingredients are added in parts per hundred resin unless otherwise indicated.
[2]Rohm and Haas, Inc.

TABLE IX[1]

| | | | | | | | |
|---|---|---|---|---|---|---|---|
| PVC/2-Ethylhexyl Acrylate Copolymer | 100 | 100 | 100 | 100 | 100 | 100 | 100 |
| Blendex 338[2] (Acrylonitrile-Butadiene-Styrene Polymer) | — | 20 | 50 | 100 | 200 | 300 | 400 |
| Calcium Carbonate —3.5μ]0 Uncoated | — | — | — | — | — | — | — |
| Hardness - Shore A ASTM D-2240 | 61 | 69 | 76 | 83 | 86 | 88 | 90 |
| Brittleness Temp. (°C.) ASTM D-746 | −22 | −10 | −15 | −51.5 | −76 | * | * |
| Clash-Berg Modulus at −35° C. (psi) ASTM D-1043 | 61,050 | 47,900 | 27,500 | 20,150 | * | * | * |
| Oil Resistance - % Vol. Swell ASTM D-471, ASTM #3 Oil 100° C./166 Hrs. | 180 | 170 | 175 | 185 | 187 | 185 | 181 |
| Tear Strength (PPI) ASTM D-624, die C | 107 | 122 | 144 | 161 | 165 | 180 | 200 |
| PVC/2-Ethylhexyl Acrylate Copolymer | 100 | 100 | 100 | 100 | 100 | 100 | 100 |
| Blendex 338[2] (Acrylonitrile-Butadiene-Styrene Polymer) | — | 20 | 50 | 100 | 200 | 300 | 400 |
| Calcium Carbonate —3.5μ Uncoated | 20 | 20 | 20 | 20 | 20 | 20 | 20 |
| Hardness - Shore A ASTM D-2240 | 67 | 74 | 78 | 83 | 87 | 90 | 89 |
| Brittleness Temp. (°C.) ASTM D-746 | −25 | −11 | −17 | −50.5 | * | * | * |
| Clash-Berg Modulus at −35° C. (psi) ASTM D-1043 | 68,300 | 54,800 | 38,300 | 19,700 | * | * | * |
| Oil Resistance - % Vol. Swell ASTM D-471, ASTM #3 Oil 100° C./166 Hrs. | 160 | 176 | 180 | 181 | 185 | 182 | 181 |
| Tear Strength (PPI) ASTM D-624, die C | 97 | 119 | 139 | 157 | 175 | 190 | 195 |

[1]Compounds also contain - stabilizer 3, co-stabilizer 4, lubricant and antioxidant 1.0. Ingredients are added in parts per hundred resin unless otherwise indicated.
[2]General Electric, Inc.
*Value was too low to be recorded by test apparatus.

TABLE X[1]

| | | | | | | | |
|---|---|---|---|---|---|---|---|
| PVC/2-Ethylhexyl Acrylate Copolymer | 100 | 100 | 100 | 100 | 100 | 100 | 100 |
| Durastrength 200[2] (Acrylic Polymer) | — | 20 | 50 | 100 | 200 | 300 | 400 |

TABLE X[1]-continued

| | | | | | | | |
|---|---|---|---|---|---|---|---|
| Calcium Carbonate —3.5μ Uncoated | — | — | — | — | — | — | — |
| Hardness - Shore A ASTM D-2240 | 61 | 69 | 76 | 83 | 89 | 91 | 91 |
| Brittleness Temp. (°C.) ASTM D-746 | −22 | −18 | −21 | −27 | −36.5 | −41.5 | −43.5 |
| Clash-Berg Modulus at −35° C. (psi) ASTM D-1043 | 61,050 | 47,700 | 34,850 | 32,800 | 39,450 | 33,500 | 17,350 |
| Oil Resistance - % Vol. Swell ASTM D-471, ASTM #3 Oil 100° C./166 Hrs. | 180 | 165 | 149 | 132 | 112 | 103 | 97 |
| Tear Strength (PPI) ASTM D-624, die C | 107 | 127 | 137 | 163 | 160 | 175 | 175 |
| PVC/2-Ethylhexyl Acrylate Copolymer | 100 | 100 | 100 | 100 | 100 | 100 | 100 |
| Durastrength 200[2] (Acrylic Polymer) | — | 20 | 50 | 100 | 200 | 300 | 400 |
| Calcium Carbonate —3.5μ Uncoated | 20 | 20 | 20 | 20 | 20 | 20 | 20 |
| Hardness - Shore A ASTM D-2240 | 67 | 72 | 77 | 84 | 89 | 91 | 91 |
| Brittleness Temp. (°C.) ASTM D-746 | −25 | −26 | −32 | −37.5 | −40.5 | −44 | −45 |
| Clash-Berg Modulus at −35° C. (psi) ASTM D-1043 | 68,300 | 58,000 | 42,300 | 31,850 | 50,000 | 19,550 | 17,750 |
| Oil Resistance - % Vol. Swell ASTM D-471, ASTM #3 Oil 100° C./166 Hrs. | 160 | 155 | 138 | 125 | 109 | 102 | 97 |
| Tear Strength (PPI) ASTM D-624, die C | 97 | 115 | 126 | 151 | 165 | 185 | 185 |

[1] Compounds also contain - stabilizer 3, co-stabilizer 4, lubricant and antioxidant 1.0. Ingredients are added in parts per hundred resin unless otherwise indicated.
[2] M & T Chemicals, Inc.

TABLE XI[1]

| | | | | | | | |
|---|---|---|---|---|---|---|---|
| PVC/2-Ethylhexyl Acrylate Copolymer | 100 | 100 | 100 | 100 | 100 | 100 | 100 |
| Paraloid KM-334 (Acrylic Polymer)[2] | — | 20 | 50 | 100 | 200 | 300 | 400 |
| Calcium Carbonate —3.5μ Uncoated | — | — | — | — | — | — | — |
| Hardness - Shore A ASTM D-2240 | 61 | 72 | 80 | 84 | 88 | 90 | 90 |
| Brittleness Temp. (°C.) ASTM D-746 | −22 | −21.5 | −32 | −39.5 | −45 | −47.5 | −51.5 |
| Clash-Berg Modulus at −35° C. (psi) ASTM D-1043 | 61,050 | 49,850 | 43,900 | 33,750 | 23,650 | 22,100 | 18,750 |
| Oil Resistance — % Vol. Swell ASTM D-471, ASTM #3 Oil 100° C./166 Hrs. | 180 | 160 | 132 | 115 | 97 | 91 | 84 |
| Tear Strength (PPI) ASTM D-624, die C | 107 | 132 | 150 | 169 | 165 | 180 | 170 |
| PVC/2-Ethylhexyl Acrylate Copolymer | 100 | 100 | 100 | 100 | 100 | 100 | 100 |
| Paraloid KM-334 (Acrylic Polymer)[2] | — | 20 | 50 | 100 | 200 | 300 | 400 |
| Calcium Carbonate —3.5μ Uncoated | 20 | 20 | 20 | 20 | 20 | 20 | 20 |
| Hardness - Shore A ASTM D-2240 | 67 | 75 | 82 | 87 | 90 | 90 | 89 |
| Brittleness Temp. (°C.) ASTM D-746 | −25 | −27 | −33.5 | −37 | −44 | −45.5 | −44 |
| Clash-Berg Modulus at −35° C. (psi) ASTM D-1043 | 68,300 | 55,600 | 48,400 | 39,950 | 25,450 | 22,400 | 19,300 |
| Oil Resistance - % Vol. Swell ASTM D-471, ASTM #3 Oil 100° C./166 Hrs. | 160 | 153 | 126 | 112 | 95 | 90 | 86 |
| Tear Strength (PPI) ASTM D-624, die C | 97 | 125 | 138 | 163 | 175 | 180 | 180 |

[1] Compounds also contain - stabilizer 3, co-stabilizer 4, lubricant and antioxidant 1.0. Ingredients are added in parts per hundred resin unless otherwise indicated.
[2] Rohm and Haas, Inc.

While in accordance with the Patent Statutes, the best mode and preferred embodiment has been set forth, the scope of the invention is not limited thereto, but rather by the scope of the attached claims.

What is claimed is:

1. A blend composition having favorable low temperature properties, comprising:
a polyvinyl chloride-acrylate copolymer, said polyvinyl chloride copolymer containing from (a) about 10 parts to about 90 parts by weight of vinyl chloride units and optional vinyl component units wherein the amount of said optional vinyl component units is from about 0 to 45 parts by weight and from (b) 90 parts to about 10 parts by weight of one or more acrylate units, said acrylate unit, before polymerization, having the formula:

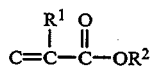

FORMULA I wherein $R^1$ is an aromatic, aliphatic, or combinations thereof, having from 1 to 18 carbon atoms, or a halogen derivative thereof, or hydrogen, and wherein $R^2$ is an aliphatic, an aromatic, an alkyl hydroxyl, or combinations thereof having from 1 to 18 carbon atoms, or a halogen derivative thereof; or a hydrocarbyl ether, an alkyoxyalkyl, a phenoxyaryl, a phenoxyalkyl, or combinations thereof, having from 2 to 1,000 carbon atoms, or a substituted halogen, oxygen, sulfur, or nitrogen derivative thereof; and said polyvinyl chloride-acrylate copolymer further being blended with one or more ethylene copolymer low temperature property improving polymers, having a weight average molecular weight in excess of 100,000 and selected from the group consisting of ethylene-vinyl acetate-carbon monoxide, ethylene-vinyl acetate, ethylene-ethyl acrylate, and ethylene-methacrylate, said blend composition having a low temperature brittleness of less than $-10°$ C. as measured by ASTM D-746.

* * * * *